United States Patent
Ezekwem et al.

(10) Patent No.: US 11,705,824 B2
(45) Date of Patent: *Jul. 18, 2023

(54) SIMPLE STABILIZATION OF HALF-BRIDGE CONVERTER OVER ITS OPERATING TEMPERATURES

(71) Applicant: Murata Manufacturing Co., Ltd., Nagaokakyo (JP)

(72) Inventors: Gerald Ezekwem, Milton Keynes (GB); Alireza Harrasi, Milton Keynes (GB)

(73) Assignee: MURATA MANUFACTURING CO., LTD., Kyoto (JP)

( * ) Notice: Subject to any disclaimer, the term of this patent is extended or adjusted under 35 U.S.C. 154(b) by 42 days.

This patent is subject to a terminal disclaimer.

(21) Appl. No.: 17/459,208

(22) Filed: Aug. 27, 2021

(65) Prior Publication Data

US 2021/0391798 A1 Dec. 16, 2021

Related U.S. Application Data

(63) Continuation of application No. 16/814,294, filed on Mar. 10, 2020, now Pat. No. 11,133,748, which is a continuation of application No. PCT/GB2018/052579, filed on Sep. 11, 2018.

(30) Foreign Application Priority Data

Sep. 12, 2017 (GB) .................................. 1714659

(51) Int. Cl.
*H02M 3/338* (2006.01)
*H02M 1/32* (2007.01)
*H02M 3/335* (2006.01)

(52) U.S. Cl.
CPC ............ *H02M 3/338* (2013.01); *H02M 1/32* (2013.01); *H02M 3/33571* (2021.05); *H02M 1/327* (2021.05)

(58) Field of Classification Search
CPC ............ H02M 3/338; H02M 3/33571; H02M 3/33507; H02M 3/33523; H02M 3/3376; H02M 1/32; H02M 1/327
See application file for complete search history.

(56) References Cited

U.S. PATENT DOCUMENTS 11,133,748 B2 * 9/2021 Ezekwem ............. H02M 3/338

OTHER PUBLICATIONS

Ezekwem et al. "Simple Stabilization of Half-Bridge Converter Over Its Operating Temperatures", U.S. Appl. No. 16/814,294, filed Mar. 10, 2020.

* cited by examiner

*Primary Examiner* — Emily P Pham
(74) *Attorney, Agent, or Firm* — Keating & Bennett, LLP

(57) ABSTRACT

A half bridge DC-DC converter device includes a primary circuit and a secondary circuit, which include separate windings that are disposed around a magnetic core. The first circuit includes two switches and a drive circuit to turn the two switches on and off in an alternating fashion. The primary circuit further includes two thermal regulating components to regulate the current at the base of the two switches over a range of operating temperatures. The regulation of base current over a range of different operating temperatures results in the half bridge converter device being efficient and maintaining a stable switching frequency over the operational temperature range.

17 Claims, 4 Drawing Sheets

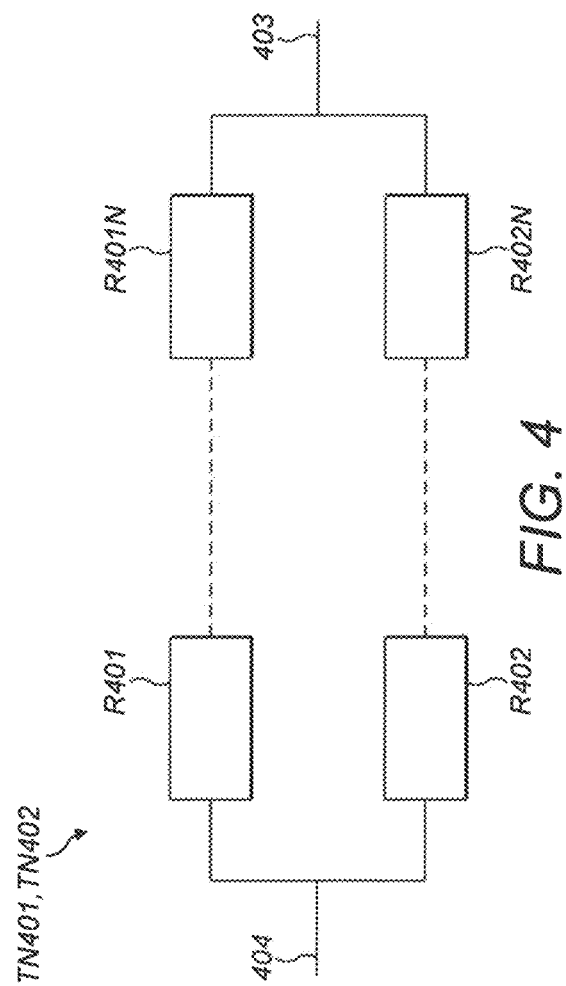

SIMPLE STABILIZATION OF HALF-BRIDGE CONVERTER OVER ITS OPERATING TEMPERATURES

CROSS REFERENCE TO RELATED APPLICATIONS

This application claims the benefit of priority to GB Patent Application No. 1714659.8 filed on Sep. 12, 2017 and is a Continuation Application of PCT Application No. PCT/GB2018/052579 filed on Sep. 11, 2018. The entire contents of each application are hereby incorporated by reference.

BACKGROUND OF THE INVENTION

1. Field of the Invention

The application relates to a DC-DC converter device, and in particular to a half bridge or push-pull DC-DC converter device with improved converter frequency stability.

2. Description of the Related Art

Conventionally, DC-DC converters based on self-oscillating half bridge circuits have had poor frequency stability and significantly reduced output voltage over their operating temperatures. This is because the circuits include transistors, which have a temperature dependent gain. In particular, the gain of a transistor is affected by temperature, such that the level of base current needed to turn on a transistor can vary dramatically according to a change in temperature. This can lead to transistor switching problems and circuit frequency instability.

Previous attempts at solving this problem include using a Royer circuit topology, wherein the converter frequency is controlled by the saturation of the transformer. In this scenario, the transistors are turned off by a change in direction of current due to saturation in a magnetic field. However, this comes at the detriment of a high peak magnetizing current and reduced converter efficiency.

It would be desirable to provide a DC-DC converter based on a self-oscillating half bridge or push-pull circuit which achieves an improved frequency stability, without reducing the converter efficiency.

SUMMARY OF THE INVENTION

According to a first preferred embodiment of the present invention, a DC-DC converter is provided, the DC-DC converter including a primary winding; a secondary winding; a first feedback winding; a second feedback winding; wherein the first and the second feedback windings are arranged to be out of phase with respect to each other, and the primary winding, the secondary winding, the first feedback winding, and the second feedback winding are electromagnetically coupled; a drive circuit including first and second switches; a first capacitor coupled with the first switch, and a second capacitor coupled to the second switch; and a first thermal regulating component coupled to the first switch, and a second thermal regulating component coupled to the second switch. The first switch is coupled to the primary winding and the first feedback winding, and the second switch is coupled to the second feedback winding. The drive circuit produces an oscillating signal by discharging the first and the second capacitors alternately to energize the first and second switches. The discharging of the first and the second capacitors is determined by electromagnetic induction in the first and second feedback windings; wherein the first and second thermal regulating components regulate the switching frequency of the first and second switches over the operating temperature range of the DC-DC converter.

Optionally, the first and the second thermal regulating components include first and second thermistors, respectively.

Optionally, the first and the second switches are transistors.

Optionally, the first and the second thermal regulating components increase or decrease current provided to the first and second switches, wherein the current is increased or decreased depending on a temperature of the DC-DC converter.

Optionally, the first and the second thermistors are negative temperature coefficient (NTC) thermistors.

Optionally, the first and the second thermal regulating components further include first and second resistors, respectively.

Optionally, the first thermistor and the first resistor are connected in parallel to define the first thermal regulating component, and the second thermistor and the second resistor are connected in parallel to define the second thermal regulating component.

Optionally, the first thermal regulating component is connected in series with the first capacitor and the first switch, and the second thermal regulating component is connected in series with the second capacitor and the second switch.

Optionally, the transistor switches are NPN-type bipolar junction transistors.

Optionally, the secondary winding is connected to a rectifier circuit.

Optionally, the rectifier circuit includes at least two diodes that rectify current induced in the secondary winding.

Optionally, the first and the second thermal regulating components include a plurality of thermistors.

Optionally, the first switch and the first thermal regulating component are substantially in thermal equilibrium with each other, and the second switch and the second thermal regulating component are substantially in thermal equilibrium with each other.

Optionally, the converter further includes a magnetic core; wherein the primary winding, the secondary winding, the first feedback winding, and the second feedback winding each surround a portion of the magnetic core.

Optionally, the primary winding, the first feedback winding, and the second feedback winding surround the magnetic core on a primary side of the magnetic core; and the secondary winding surrounds the magnetic core on a secondary side of the magnetic core.

Optionally, the DC-DC converter includes a half-bridge circuit topology or a push-pull circuit topology.

According to a second preferred embodiment of the present invention, a power switching electronic device is provided, wherein the power switching electronic device includes the DC-DC converter according to the first preferred embodiment of the present invention.

The above and other features, elements, characteristics and advantages of the present invention will become more apparent from the following detailed description of preferred embodiments of the present invention with reference to the attached drawings.

BRIEF DESCRIPTION OF THE DRAWINGS

FIG. 4 is a circuit diagram of a portion of a half bridge DC-DC converter according to an alternative preferred embodiment of the present invention.

DETAILED DESCRIPTION OF THE PREFERRED EMBODIMENTS

Figure 1:
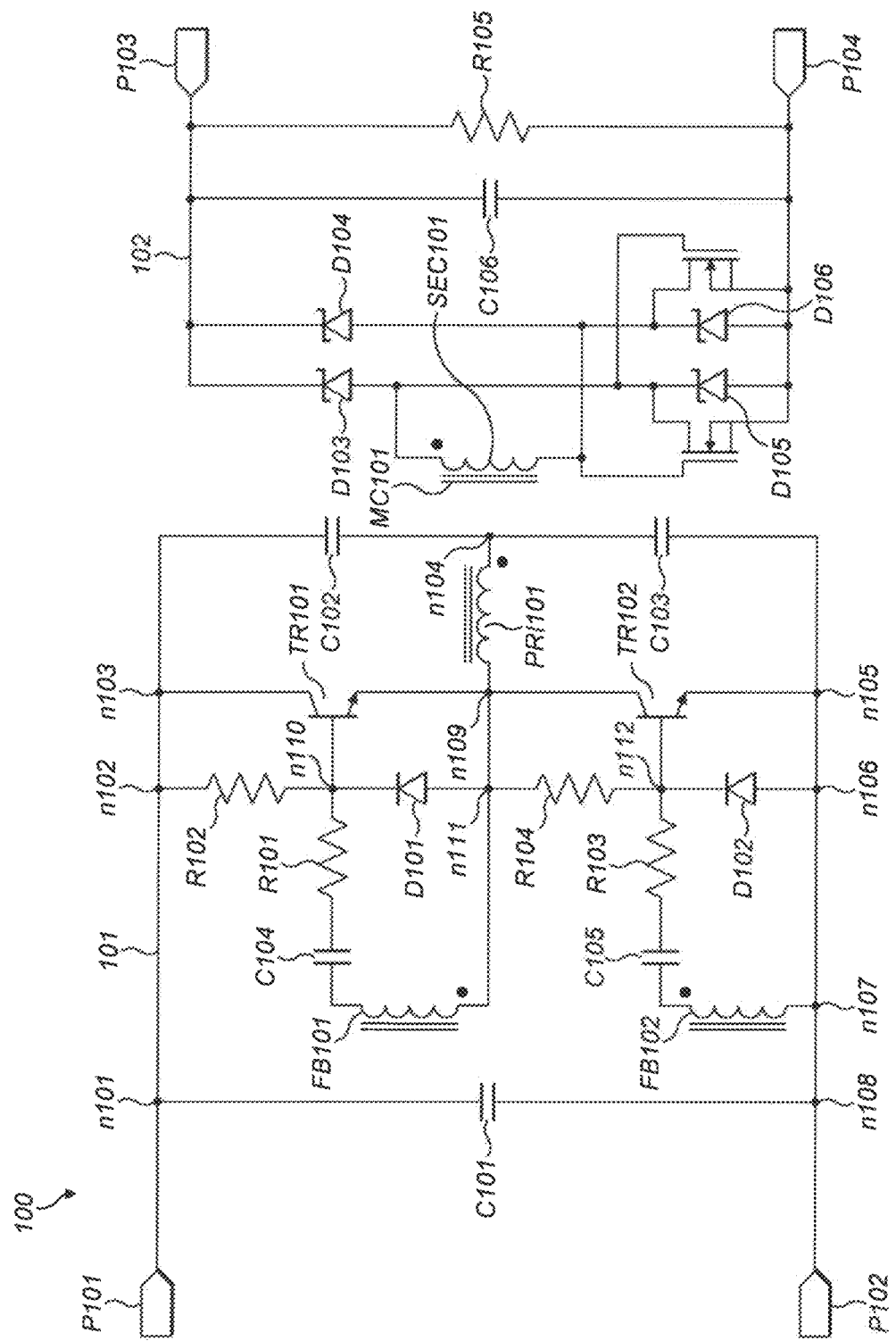
FIG. 1 is an example of a circuit diagram of a half bridge DC-DC converter.

A first example of a known half bridge DC-DC converter device circuit is described here with reference to FIG. 1. The first example of the half bridge DC-DC converter device circuit includes capacitors C101 to C106, resistors R101 to R105, transistors TR101 and TR102, a primary winding PRI101, at least one secondary winding SEC101, two feedback windings FB101 and FB102, and diodes D101 to D106. These components are connected as shown in FIG. 1.

In FIG. 1, the half bridge DC-DC converter device circuit 100 can be seen as including a primary side 101 and a secondary side 102. The primary side 101 of the converter circuit 100 includes transistors TR101 and TR102, the primary winding PRI101 and the feedback windings FB101 and FB102. The primary side of the circuit is configured to alternately turn transistor TR101 on and transistor TR102 off, and vice versa, providing an alternating voltage of equal magnitude across the primary winding PRI101. The secondary side 102 of the circuit 100 includes the secondary winding SEC101. The secondary side 102 is configured to provide an output of DC voltage.

The primary side 101 of the converter circuit 100 will now be discussed in more detail. The primary side 101 includes an input voltage rail P101 and a negative or ground voltage rail P102. Input voltage rail P101 is ultimately connected to negative or ground voltage rail P102 via a series of nodes n101 to n108 and capacitors C102 and C103. These components are connected to each other in the order: input voltage rail P101-node n101-node n102-node n103-capacitor C102-node n104-capacitor C103-node n105-node n106-node n107-node n108-negative or ground voltage rail P102. Node n101 connects to node n108 in parallel, via capacitor C101. Node n103 connects in parallel to node n105, via transistors TR101 and TR102. In particular, node n103 is connected to the collector of transistor TR101. The emitter of transistor TR101 is connected to a node n109. Node n109 is connected to the collector of transistor TR102, and the emitter of transistor TR102 is connected to node n105. Node n109, which is connected between the transistors, also connects to node n104 between the capacitors C102 and C103 via the primary winding PRI101.

Each of the transistors TR101 and TR102 includes a drive circuit which connects to their respective bases. These drive circuits include two resistors, a diode, a capacitor and a feedback winding.

The drive circuit of transistor TR101 is connected to node n102. Specifically, node n102 connects to a node n110 via resistor R102. Node n110 connects to the base of the transistor TR101. Furthermore, node n109, which connects in between the emitter of TR101 and the collector of TR102, connects to a node n111. Node n111 connects back to node n110 via a diode D101. Node n111 also connects to n110 via feedback winding FB101, capacitor C104 and resistor R101, connected in the order: n111-FB101-C104-R101-n110.

The drive circuit of transistor TR102 is arranged similarly. Specifically, node n111 connects to a node n112 via resistor R104. Node n112 connects to the base of the transistor TR102. Furthermore, node n105, which connects to the emitter of transistor TR102, connects to node n105 which connects back to node n112 via a diode D102. Node n105 also connects to node n112 via feedback winding FB102, capacitor C105 and resistor R103, connected in the order: node n105-feedback winding FB102-capacitor C105-resistor R103-node n112.

The feedback windings FB101 and FB102 are arranged 180° out of phase with respect to each other. This is represented in FIG. 1 using dot notation.

The secondary side 102 of the converter circuit 100 includes a positive output voltage rail P103 and a negative output voltage rail P104, and a rectifier circuit. The rectifier circuit includes secondary winding SEC101 and diodes D103 to D106. These components are arranged as shown in FIG. 1 such that current from winding SEC101 is output in one direction, regardless of the direction in which it was induced.

When set up, the windings PRI101, FB101, and FB102 may be wound around a portion of a magnetic core MC101. The secondary winding SEC101 may be also be wound around a portion of the magnetic core MC101.

In operation of the half bridge converter circuit 100, a voltage is applied to voltage input rail P101. Transistors TR101 and TR102 are initially both in off states, functioning as open switches, and current cannot flow easily from collector to emitter. A flow of current takes the path from positive input voltage rail P101 through nodes n101, n102 and resistor R102 to charge capacitor C104. In FIG. 1, capacitor C104 is charged on the right hand side plate with positive charge. Current continues to flow through feedback winding FB101, node n111, and resistors R104 and R103 to charge capacitor C105. In FIG. 1, the right hand side plate of capacitor C105 is charged positively. Current continues from capacitor C105 through feedback loop FB102 and finally enters the negative input rail P102 via nodes n107 and n108. Due to dissimilarities in the properties of the transistor switches (TR101 and TR102), one will turn on first—thus, the current at the base of the transistor will be enough to allow current flow through the transistor. This turn-on process makes the other transistor inactive.

When transistor TR101 is turned on, the primary winding PRI101 is energized as current can now flow from the collector of TR101 at node n103 to the emitter of transistor TR101 at node n109. This creates a magnetic field around the magnetic core MC101. The resulting change in magnetic field strength of the new magnetic field induces an electromotive force (EMF), and therefore a current, in the secondary winding SEC101. The primary winding PRI101 similarly induces an EMF in feedback windings FB101 and FB102. During the transistor TR101 on phase, the no-dot-end of each of the windings PRI101, SEC101, FB101, and FB102 has a positive charge. Transistor TR102 remains in an off state; thus, current cannot flow from collector of transistor TR102 to emitter of TR102.

During the turn-on phase of transistor TR101, the charge which was initially built up on the right hand side plate of capacitor C104 is discharged, through resistor R101 and to the base of the transistor TR101. Due to the phase relationship of the windings, feedback winding FB101 also begins to charge the left hand side of capacitor C104 with more positive charge, resulting in two components of current flowing to the base of the transistor TR101—the current from the discharge of the capacitor C104 and current from the feedback winding FB101 which charges the left side of capacitor C104. The additional current supplied by the feedback winding FB101 results in the transistor TR101 being effectively turned on even more; thus, current can flow from the collector to emitter more easily. This results in a linear increase in current flowing through transistor TR101, until the amount of current being discharged from the capacitor C104 decreases below a level necessary to sustain the transistor TR101 in the on phase.

Once the level of current is below the level needed to sustain transistor TR101 in the on phase, the transistor TR101 turns off; thus, current cannot easily flow from the collector to emitter. The turn-off of transistor TR101 results in significantly less current flowing through the primary winding PRI101. This occurs before saturation of the magnetic field. The reduction in current in the primary winding PRI101 leads to a change in magnetic field strength which induces an EMF in the secondary winding SEC101. In turn, this induces an EMF and current in the feedback windings, in a direction opposite to the original inductance direction of the transistor TR101 on phase. Hence, voltages at the dot ends of each of the windings of FIG. 1 are now positive. The turn off process is aided by the accumulation of positive charge on the left hand side of capacitor C104. The charge on capacitor C104, together with the current from the feedback winding FB101, which now changes direction, contributes to a negative voltage at the base of transistor TR101.

The above processes then repeat from the perspective of transistor TR102. Capacitor C105, which holds positive charge on its right plate from current through resistors R104 and R103 at start-up and in normal operation, begins to discharge due to the change in direction of current of feedback winding FB102. In particular, once transistor TR101 turns off, current in the feedback winding FB102 changes direction such that a current travels towards the left hand side of capacitor C105, charging the left side positively. The discharge of the capacitor C105 provides current to the base of transistor TR102 via node n112. Hence, when transistor TR101 turns off, there is a change in magnetic field which results in capacitor C105 discharging, which in turn causes transistor TR102 to turn on.

As with the transistor TR101 on phase, the current from feedback winding FB102 contributes to the current at the base of the transistor TR102; thus, there are two components of current flowing to the base of the transistor TR102—the current from the discharge of the capacitor C105 and current from the feedback winding FB102 which also charges the left side of capacitor C105. The additional current supplied by the feedback winding FB102 results in the transistor TR102 being effectively turned on even more; thus, current can flow from the collector to emitter more easily. This results in a linear increase in current flowing through transistor TR102, until the amount of current being discharged from the capacitor C105 decreases below a level necessary to sustain the transistor TR102 in the on phase.

As transistor TR101 is in the off phase, current from the input rail P101 must take the start-up path input voltage rail P101-node n101-node n102-resistor R102-node n110-resistor R101-capacitor C104-feedback winding FB101-node n111 to reach transistor TR102. Current travels from the collector of transistor TR102 to the emitter and eventually reaches the ground or negative rail P102. Therefore, as with start-up, capacitor C104 begins to gain positive charge on its right hand side plate.

Once the level of current at the base of transistor TR102 is below the level needed to sustain transistor TR102 in the on phase, the transistor TR102 turns off; thus, current cannot easily flow from the collector to emitter. The turn-off of transistor TR102 results in a change in the current flowing through the primary winding PRI101. This occurs before saturation of the magnetic field. The reduction in current in the primary winding PRI101 leads to a change in magnetic field strength which induces an EMF in the secondary winding SEC101. In turn, this induces an EMF and current in the feedback windings FB101, FB102, in a direction equal to the original inductance direction of the transistors TR101 on phase. Hence, voltages at the no-dot ends of each of the windings are now positive.

The turn off process of transistor TR102 is aided by the accumulation of positive charge on the left hand side of capacitor C105. This charge, together with the current from the feedback winding FB102, which changes direction due to the turn off of transistor TR102, contributes to a negative voltage at the base of transistor TR102.

The turn-off of transistor TR102 causes capacitor C104, which is now charged positively on its right hand side, to discharge, and turn on transistor TR101. Hence, the circuit reverts back to the transistor TR101 on phase and the cycle is complete. This process now repeats.

Essentially therefore, transistors TR101 and TR102 switch between exclusive on and off states before the magnetic field saturates due to the DC supply. This switching is managed and driven by the charge and discharge times of capacitors C104 and C105, respectively.

Avoiding saturating the magnetic field improves performance as the on time and load across the transistors is reduced. However, due to the temperature dependencies of the transistors TR101 and TR102, there is a problem with operating this circuit across a range of temperatures. In particular, transistors usually require less base voltage when operated at higher temperatures, in order to switch on and allow current to pass from collector to emitter. This is due to the intrinsic semiconductor properties of the transistors. This temperature dependency can have profound effects on the circuit of FIG. 1, as any change in temperature can result in less or more base current being needed to turn on the transistors. This can result in inconsistencies in the frequency of switching between the on/off phases of a transistor, and can also result in transistors being on too long, such that a shoot-through occurs, resulting in both transistors being on at the same time. Furthermore, keeping a transistor on too long can result in saturation of the magnetic field; thus, the circuit may start to behave like a Royer circuit with much less efficiency.

A solution to these problems results in the half bridge converter circuit being able to operate efficiently and properly in a much wider range of temperatures.

It is to be understood that the features of the following preferred embodiments can be readily applied to any DC-DC converter device that includes a switching action. For example, a push-pull circuit topology can be used as well as the half-bridge circuit topology provided.

Figure 2:
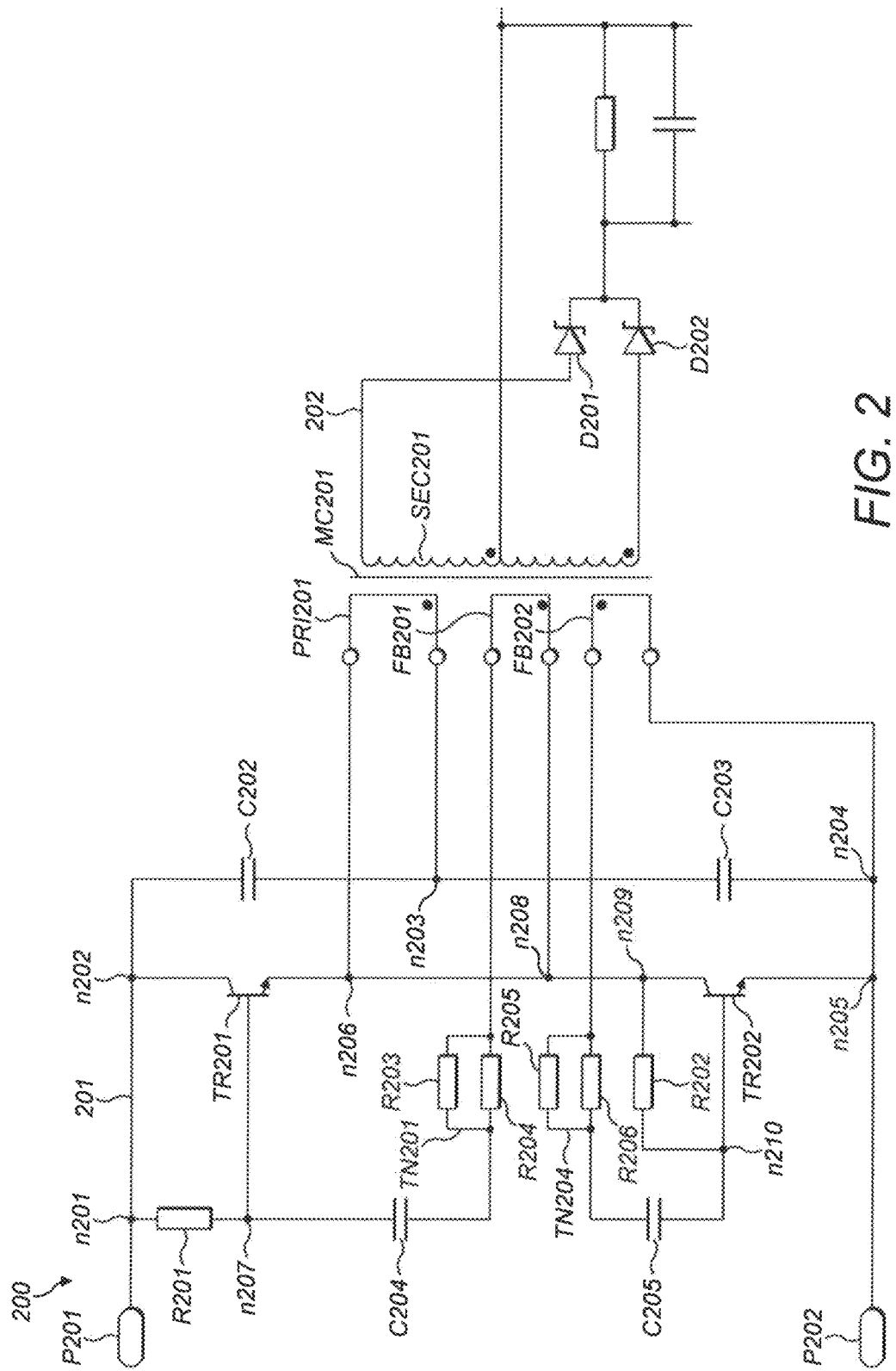
FIG. 2 is a circuit diagram of a half bridge DC-DC converter according to a preferred embodiment of the invention.

Referring to FIG. 2, a preferred embodiment of the present invention will now be described.

FIG. 2 shows the half bridge DC-DC converter device circuit 200. The converter device circuit includes two sides, the primary side 201 and the secondary side 202. The converter device circuit 200 forms a transformer circuit. Initially, the primary side of the circuit 201 will be discussed in detail.

The primary side 201 of the converter circuit 200 includes two switches TR201 and TR202, a primary winding PRI201 and feedback windings FB201 and FB202. The primary side of the circuit 201 is configured to turn switch TR201 on and switch TR202 off and vice versa. In a preferred embodiment of the present invention, the switches TR201, TR202 are transistors, and in particular NPN-type bipolar junction transistors. The primary side of the circuit 201 is configured to be connectable to a magnetic core MC201, which is also connectable to the secondary side 202. The secondary side of the circuit 202 includes a secondary winding SEC201. The secondary side 202 is configured to provide an output of a DC voltage. The magnetic core MC201 is a transformer core. Together with the windings FB201, FB202, PRI201, and SEC201, magnetic core MC201 forms a transformer.

The primary side 201 includes an input voltage rail P201 and a negative or ground voltage rail P202. Input voltage rail P201 is connected to negative or ground voltage rail P202 via a series of nodes n201 to n205 and capacitors C202 and C203. These components are connected to each other in the order: input voltage rail P201-node n201-node n202-capacitor C202-node n203-capacitor C203-node n204-node n205-negative or ground voltage rail P202. Node n201 connects to a node n207 in parallel, via capacitor resistor R201. Node n202 connects in parallel to node n205, via switches TR201 and TR202. In particular, node n202 is connected to the collector of switch TR201. The emitter of switch TR201 is connected to a node n206. Node n206 is connected to the collector of switch TR202 via nodes n208 and n209, and the emitter of switch TR202 is connected to node n205.

Each of the switches TR201 and TR202 includes a drive circuit connected to its respective base. These drive circuits include a resistor, a capacitor and a feedback winding. Furthermore, a thermal regulating component, such as a thermistor, or a thermistor network is incorporated into the drive circuits of each of switches TR201 and TR202.

The drive circuit of switch TR201 is connected to nodes n201, n202, n203, n206, and n208. Specifically, node n201 connects to node n207 via resistor R201. Node n207 connects to the base of the switch TR201, and to a capacitor C204. In FIG. 2, node n207 connects to the top or positive plate of capacitor C204. Node n202 connects to the collector of switch TR201. The emitter of switch TR201 is connected to node n206. Node n206 is connected to node n203 via primary winding PRI201. As mentioned above, node n203 connects between capacitors C202 and C203. These capacitors play a role in balancing the volt-second product of the two half cycles of the primary circuit 201, which helps to prevent staircase saturation of the magnetic core MC201. The capacitor C204 is connected to thermistor network TN201 which connects to the feedback winding FB201. In FIG. 2, the lower or negative plate of the capacitor C204 connects to the thermistor network TN201 whilst the upper plate of capacitor C204 connects to node n207 as discussed above.

The drive circuit of switch TR202 is arranged similarly. Specifically, the drive circuit of switch TR202 is connected to nodes n209, n210, n205, and n204. Node n208, connected to feedback winding FB201, also connects to node n209. Node n209 connects to node n210 via resistor R202. Node 209 also connects to the collector of the switch TR202. Node 210 connects to the base of the switch TR202 on one side, and capacitor C205 on the other side. The emitter of switch TR202 connects to node n205. Node n205 connects to node n204, which is connected to feedback winding FB202. Feedback winding FB202 is connected to the capacitor C205 via a second thermistor network TN202. In FIG. 2, the thermistor network TN202 connects to the top plate of the capacitor C205, whilst the bottom plate of capacitor C205 connects to the base of the switch TR202 via node n210.

The feedback windings FB201 and FB202 are arranged 180° out of phase with respect to each other. This is represented in FIG. 2 using dot notation. In other words the feedback windings FB201 and FB202 have opposite polarity.

When set up, the windings PRI201, FB201, and FB202 may be wound around a portion of the magnetic core MC201. The secondary winding SEC201 may be also be wound around a portion of the magnetic core MC201.

The thermistor networks TN201 and TN202 each include a thermistor. In particular, thermistor network TN201 includes a thermistor R203 and a resistor R204, arranged in parallel. Similarly, thermistor network TN202 includes a thermistor R205 and a resistor R206, arranged in parallel. The thermistors R203 and R205 are negative temperature coefficient (NTC) thermistors.

In operation of a preferred embodiment of the present invention as shown in FIG. 2, a voltage is applied to voltage input rail P201. Transistors TR201 and TR202 are initially both in off states, functioning as open switches, and current cannot flow easily from collector to emitter. A flow of current takes the path from positive input voltage rail P101 through node n201 and R201 to charge capacitor C204. In FIG. 2, capacitor C204 is charged on the top plate with positive charge. Current continues to flow through thermistor network TN201 and feedback winding FB201 to node n208. From here, current flows through node n209, the resistor R202 and the node n210 to charge capacitor C205. In FIG. 2, the capacitor C205 is charged on the bottom plate with positive charge. Current continues to flow through thermistor network TN202 and feedback winding FB202 to node n204. From here, current flows through node n205 and finally enters the negative input rail P202.

Due to discrete dissimilarities in property of the switches TR201 and TR202, or the capacitors C204 and C205, one transistor will turn on first—thus, the current at the base of the transistor will be enough to allow current flow through the transistor from collector to emitter.

Either switch TR201 or TR202 will turn on. Assuming switch TR201 turns on first, then the positive charge that was initially built up on the top plate of capacitor C204 is gradually discharged towards the base of switch TR201. This process makes the other switch TR202 inactive.

Similarly, if switch TR202 were to turn on first, the positive charge that was initially built up on the bottom plate of capacitor C205 will be discharged towards switch TR202. This process would make switch TR201 inactive.

When switch TR201 is turned on, the primary winding PRI201 is energized as current can now flow from the collector of TR201 to the emitter of TR201 and through node n206 to the primary winding PRI201. This creates a magnetic field around the magnetic core MC201. The resulting change in magnetic field strength of the new magnetic field induces an electromotive force (EMF), and therefore a current, in the secondary winding SEC201. As a consequence of this, magnetic field strength changes and an EMF is induced in feedback windings FB201 and FB202. During the TR201 on phase, the no-dot-end of each of the windings PRI201, SEC201, FB201 and FB202 has a positive charge.

Transistor TR202 remains in an off state; thus, current cannot flow from collector of TR202 to emitter of TR202.

Due to the phase relationship of the primary, secondary and feedback windings, current from feedback winding FB201 travels through the thermistor network TN201 and begins to charge the bottom plate of the capacitor C204 with positive charge. At this moment, capacitor C204 is still discharging the positive charge on the top plate towards the base of switch TR201. Thus, there are two components of current flowing to the base of the switch TR201—the current from the discharge of the capacitor C204 and current from the feedback winding FB201 which charges the bottom plate of capacitor C204 as seen in FIG. 2. The additional current supplied by the feedback winding FB201 results in the switch TR201 being effectively turned on even more; thus, current can flow from the collector to emitter more easily. This results in a linear increase in current flowing through switch TR201, until the amount of current being discharged from the capacitor C204 decreases below a level necessary to sustain the switch TR201 in the on phase.

During the TR201 on phase, the capacitor C205 is charged positively on the bottom plate as seen from FIG. 2, through resistor R202 and due to the direction of current in feedback winding FB202. Transistor TR202 stays in the off state.

Once the level of current is below the level needed to sustain switch TR201 in the on phase, the switch TR201 turns off; thus, current cannot easily flow from the collector to emitter. The turn-off of switch TR201 results in significantly less current flowing through the primary winding PRI201. This occurs before saturation of the magnetic field. The reduction in current in the primary winding PRI201 leads to a change in magnetic field strength which induces an EMF in the secondary winding SEC201. Similarly, an EMF and current are induced in the feedback windings FB201 and FB202, in a direction opposite to the original inductance direction of the switch TR201 on phase. Hence, voltages at the dot ends of each of the windings of FIG. 2 are now positive. The turn off process is aided by the accumulation of positive charge on the bottom plate of capacitor C204. The charge on capacitor C204, together with the current from the feedback winding FB201, which now changes direction, contributes to a negative voltage at the base of switch TR201. This effectively turns the switch TR201 off even more; thus, much less current is able to pass through switch TR201 from collector to emitter, and the switch TR201 behaves like an open switch.

The above processes then repeat from the perspective of switch TR202. Capacitor C205, which holds positive charge on its lower plate at start-up, begins to discharge due to the change in direction of current of feedback winding FB202. In particular, once switch TR201 turns off, current in the feedback winding FB202 changes direction such that a current travels from the feedback winding FB202, through thermistor network TN202, and begins to charge the top plate of capacitor C205 with positive charge. Hence, when switch TR201 turns off, there is a change in magnetic field which results in capacitor C205 discharging, which in turn causes switch TR202 to turn on.

As with the switch TR201 on phase, the current from feedback winding FB202 contributes to the current at the base of the switch TR202. Thus, there are two components of current flowing to the base of the switch TR202—the current from the discharge of the capacitor C205 and current from the feedback winding FB202 which also charges top plate of capacitor C205. The additional current supplied by the feedback winding FB202 results in the transistor TR102 being effectively turned on even more; thus, current can flow from the collector to emitter more easily. This results in a linear increase in current flowing through switch TR202, until the amount of current being discharged from the capacitor C205 decreases below a level necessary to sustain the switch TR202 in the on phase.

As switch TR201 is in the off phase, current from the input rail P201 must take the start-up path: input rail P201-node n201-resistor R201-node n207-capacitor C204-thermistor network TN201-feedback windings FB201-node n208 to go through the collector and emitter of switch TR202 and to eventually reach the ground or negative rail P202. Therefore, as with start-up, capacitor C204 begins to gain positive charge on its right hand side plate.

Once the level of current at the base of switch TR202 is below the level needed to sustain switch TR202 in the on phase, the switch TR202 turns off; thus, current cannot easily flow from the collector to emitter. The turn-off of switch TR202 results in a change in the magnetic field strength in the feedback winding FB202. This occurs before saturation of the magnetic field, and is aided by the accumulation of positive charge on the top plate of capacitor C205. This charge effectively begins to block the DC current at the capacitor. This charge, together with the current from the feedback winding FB202, which changes direction due to the turn off of switch TR202, contributes to a negative voltage at the base of switch TR202. The change in magnetic field strength in the feedback winding FB202 induces an EMF and current in the other windings, in a direction equal to the original inductance direction of the switch TR201 on phase. Hence, voltages at the no-dot ends of each of the windings are now positive.

This change in direction of current in the windings causes capacitor C204, which is now charged positively on its top plate, to discharge, and turn on switch TR201. Hence, the circuit reverts back to the switch TR201 on phase and the cycle is complete. This process now repeats.

Essentially therefore, switches TR201 and TR202 switch between exclusive on and off states before the magnetic field saturates due to the DC supply. The switching is a result of the change in magnetic field strength at the end of each half-cycle of the circuit 201, and this is driven by the charge and discharge times of capacitors C204 and C205.

The NTC thermistors R203 and R205 are arranged in parallel to resistors R204 and R206 to form thermistor networks TN201 and TN202 respectively. This particular parallel arrangement results in current passing through the thermistor networks TN201 and TN202 being subject to a temperature dependent effective resistance, given by the sum of the reciprocals of the resistance provided by the thermistor and the resistor in each thermistor network. As the thermistors are NTC thermistors, the resistance of the thermistors decreases when temperature increases. At high temperatures, the resistance of the thermistor networks TN201 and TN202 is lower than the resistance of the thermistor networks TN201 and TN202 at higher temperatures. The parallel resistor and thermistor arrangement such as in the thermistor networks TN201 and TN202 helps to limit the effective resistance of the thermistor networks. In particular, the presence of the resistors R204 and R206 results in the effective resistance of the thermistor networks not reaching values which are too large at low temperatures.

The benefit of the thermistor networks TN201 and TN202 is that they provide a counter-effect to the temperature dependency problem of the transistors discussed previously. The thermistor networks TN201 and TN202 therefore adjust or compensate for the temperature dependency of the transistors or switches such that the half bridge DC-DC converter circuit achieves a stable switching frequency that is independent of its operating temperature. Thus, the thermistor networks TN201 and TN202 regulate the switching frequency of the switches TR201 and TR202 over the operating temperature range of the DC-DC converter.

It is to be understood that, at least when in use, the thermistor networks TN201 and TN202 are substantially in thermal equilibrium, within measurement tolerances, with the switches TR201 and TR202, respectively.

To reiterate, the switches TR201 and TR202 have a temperature dependent gain. At high temperatures, the gain of the switches TR201 and TR202 increases. Thus, the base current required to turn on the switches TR201 and TR202 is much less than what is required at lower temperatures. The temperature dependency of transistor gain is due to the intrinsic semiconductor properties of the transistors. This temperature dependency can have profound effects on half bridge self-oscillating circuits such as in FIGS. 1 and 2, as any change in temperature can result in less or more base current being needed to turn on the switches TR201 and TR202. This can result in inconsistencies in the frequency of switching between the on/off phases of a transistor. For instance, a higher temperature can result in higher gain on the switches TR201 and TR202, which results in the switches TR201 and TR202 requiring less base current and consequently are kept in the on state longer. Switching between the transistors therefore becomes less frequent. Furthermore, if the transistors are kept on too long, the circuit may become capacitor limited, resulting in the switching depending on the charge-up rates of the capacitors C204 and C205, instead of the changes in magnetic field strength. With further increase in temperature, the transistor which is turned off can be switched on due to the charge-up of its base capacitor, and hence shoot through can occur. This situation should be avoided. Furthermore, keeping a transistor on too long can result in saturation of the magnetic field; thus, the circuit may start to behave like a Royer circuit with much less efficiency. On the other hand, at low temperatures, the gain on the transistors may be reduced, such that more base current is required to turn on the transistors. This can result in the transistors being turned off more rapidly because the discharge current from the capacitors is not enough to maintain the on state. This can lead to much more frequent switching which may also be inefficient.

The thermistor networks provide increased resistance at lower temperatures and decreased resistance at higher temperatures. This temperature dependent change in resistance counteracts the temperature dependent change in gain of the switches TR201 and TR202 by altering the discharge current of the capacitors C204 and C205. It is clear to see how this works from the equation representing discharged current of a capacitor, as given below:

$$i(t) = I_0 e^{\frac{-t}{RC}}$$

In the above equation, i(t) is the current being discharged from the capacitor at time t, $I_0$ is the initial current, and RC is resistance multiplied by capacitance, and represents the time constant of the capacitor.

As noted above, when the temperature is high, the transistor gain is high; thus, the base current required to turn on and maintain the transistors is low. When the temperature is high, the resistance from the NTC thermistor networks is low. A low value of R in the above equation results in the exponent taking a relatively large negative value. Thus, the natural exponential tends towards zero, and is relatively low. In turn, the current i(t) is low. Hence, at high temperatures, the thermistor networks ensure that the current discharged from the capacitor is relatively low. This counteracts the low base current needed to turn the transistor on at high temperatures.

Similarly, when the temperature is low, the transistor gain is low; thus, the base current required to turn on and maintain the transistors is high in comparison to the higher temperature example above. When the temperature is low, the resistance from the NTC thermistor networks is high. A high value of R in the above equation results in the exponent taking a relatively small negative value in comparison to the high temperature example above. Thus, the natural exponential is a higher value than the high temperature example. Hence, current i(t) is larger. Therefore, at low temperatures, the thermistor networks ensure that more current is discharged from the capacitor in comparison to the high temperature example. This counteracts the high base current needed to turn the transistor on at low temperatures.

In other words, the transistor networks TN201 and TN202 modify the current that the capacitors C204 and C205 provide to the switches TR201 and TR202, such that the current provided to the transistors from the capacitors is proportionate to the current required to turn on and maintaining the transistors, over a wide range of temperatures. This range may be predetermined by the manufacturer of the DC-DC converter device. For instance, the temperature range may be −40° C. to 100° C.

Provided that the thermistors and capacitors implemented in the circuit 201 of FIG. 2 are selected according to the temperature dependency of the gain of the transistors, the circuit 201 provides significantly better switching frequency stability over a range of temperatures when compared with previous half bridge circuits. Having a better frequency stability leads to an increase in overall efficiency of the DC-DC converter device.

Referring now to the secondary side 202 of the half bridge DC-DC converter device circuit 200 as seen in FIG. 2, the secondary side of the circuit 202 includes the secondary winding SEC201 and diodes D201 and D202. The secondary winding SEC201 may be wound around a magnetic core MC201.

In operation of the circuit 200, the primary side switches between exclusive switch TR201 on states and switch TR202 on states. As discussed above, the switching of the primary side 201 leads to the induction of an EMF and therefore current in the secondary winding SEC201. This current changes direction depending on which of the transistors TR201 or TR202 is turned on. Therefore, current appears in the secondary side 202 as if it were an AC supply. In order to convert back to DC as required by the nature of the DC-DC converter device 200, the diodes D201 and D202 allow current from either side of the secondary winding SEC201 to enter the rest of the rest of the circuit 202 in a common direction. Hence the secondary side 202 of the circuit 200 is an example of a rectifier that ensures that a DC output is provided.

Alternative preferred embodiments will now be described. It is to be understood that many of the components of the circuit 200 according to FIG. 2 are not constrained to the positions within the circuit 201 and/or 202 as they are illustrated in FIG. 2. The thermistor networks TN201 and TN202 may be positioned anywhere in series with the capacitor C204 and the capacitor C205 respectively, provided they are in the same drive circuit as the respective capacitors. For instance, the thermistor network TN201 may be positioned as it is in FIG. 2, between the feedback winding FB201 and the capacitor C204, or alternatively, it may be positioned between the capacitor C204 and the base of the switch TR201. This logic also applies to thermistor network TN202.

It is to be understood that the components according to preferred embodiments of the present invention, as seen in FIG. 2, may be substituted for similar components. Furthermore, some components may be removed from the circuit according to FIG. 2. The transistors of the present preferred embodiment of the present invention are NPN bipolar junction transistors. However, these may be substituted for other types of transistors provided that they are able to switch the circuit 200 in a similar way to the NPN bipolar transistors. For instance Field Effect Transistors (FETs) may be used instead of the bipolar transistors.

Diodes such as D101 and D102 in FIG. 1 may be incorporated in the corresponding positions in the circuit of FIG. 2 and therefore introduced to the circuit 200. These diodes can help protect switches TR201 and TR202 from harmful reverse voltages, but should only be used when the reverse voltage at the base of the transistors exceeds the transistor base-emitter maximum reverse voltage rating.

Similarly, the capacitor C101 from FIG. 1 may be incorporated in the corresponding position in FIG. 2.

It should be understood that capacitors C202 and C203 in FIG. 2 function as balancing capacitors, that balance the volt-second product of the two half cycles (switching on periods) of the switches TR201 and TR202. This helps to prevent staircase saturation of the transformer core MC201. The capacitors C202 and C203 should be selected such that the capacitance is not large enough to create a non-zero volt-second value, over a cycle of operation. On the other hand, the capacitance should not be low enough to cause high ripple voltages at the output P203 and P204. Very low capacitance values will set up a series resonance circuit which can cause high switching frequency losses and high core losses leading to very low efficiencies as shown and thus should be avoided. Choosing appropriate capacitance values of capacitors C202 and C203 can reduce the likelihood of these issues.

It should be further understood that the resistors R201 and R202 in FIG. 2 are start-up resistors that help in charging capacitors C204 and C205. These resistors also act as current limiting resistors and affect the on times of the switches TR201 and TR202. The resistors R201 and R202 do not have to have equal resistance and furthermore different components that provide resistance can be used within the circuit 200. The resistors may not be necessary if the current and/or voltage entering the input rail P201 is regulated accordingly, or if the resistors are substituted by some other sort of resistive component such as more resistive wiring. The resistance of the resistors R201 and R202 should be selected low enough to start the circuit at its lowest input conditions (for example 4.5V and 0.2 A), and lowest temperature conditions, where the gain of the transistors is at its lowest (for example −40° C.).

Figure 3:
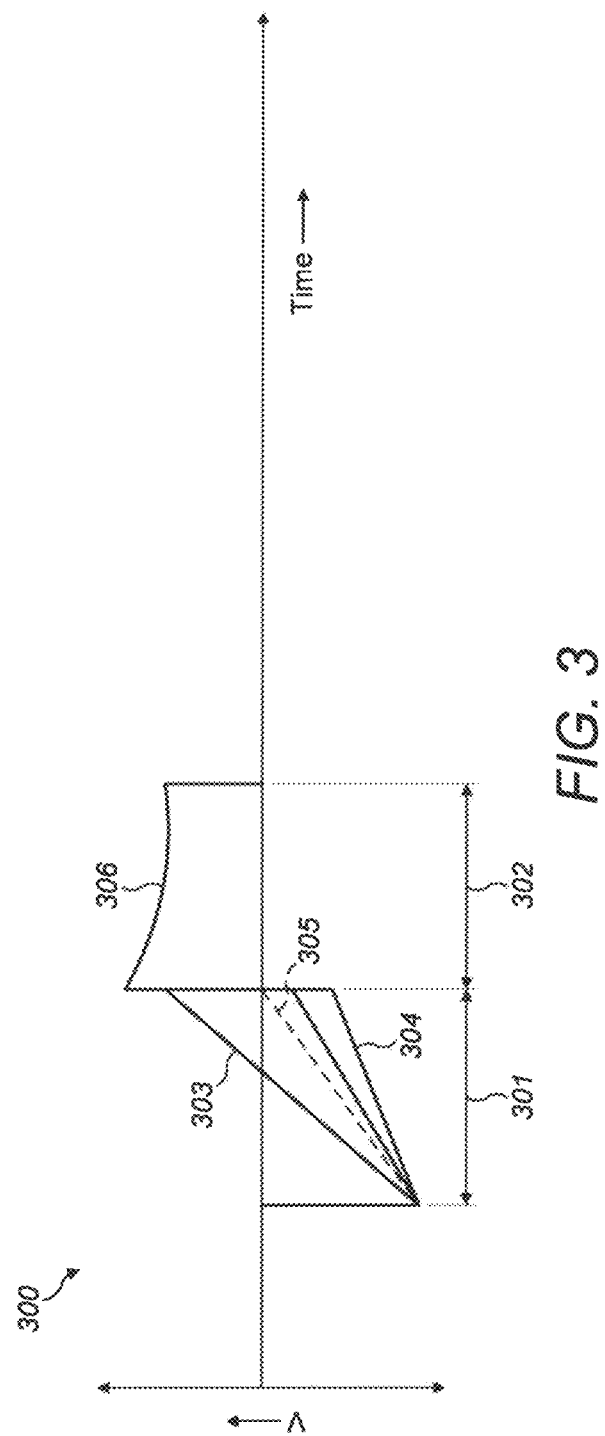
FIG. 3 is an exemplary graph of voltage against time at the base of a switch according to a preferred embodiment of the present invention.

Decreasing the resistance of the start-up resistors R201 and R202 will increase the transistor turn on-time as can be seen in FIG. 3. In particular, FIG. 3 shows an exemplary graph 300 of voltage at the base of the switch TR201 on they axis, against time on the x axis. The off-time of the switch TR201 is represented by period 301, and the on-time is represented by period 302 and line 302. Different resistor choices of the resistor R201 lead to different turn-off period voltages at the base of the switch TR201, given by lines 303, 304, and 305. The line 303 and the space above in FIG. 3 should be avoided as this indicates that the capacitor C204 is being charged above a safety margin during the off-period by resistor R201. With resistors of decreased resistance, the circuit operation will eventually move from non-saturated operation mode into saturated Royer circuit type operation, which results in a detrimental high peak magnetizing current and lower efficiency. Therefore, the resistance of resistors R201 and R202 should not be low enough to allow saturation of the transformer windings.

It is to be understood that the capacitors C204 and C205 should be selected according to the required base current of the switches TR201 and TR202, or vice versa. In other words, the capacitance of the capacitor should be selected such that the current discharged from the capacitor is enough to turn on and maintain the transistors as seen in FIG. 3. Therefore, the capacitance of the capacitors C204 and C205 may vary depending on the desired switching frequency and preferred on times of the transistors. Furthermore, the capacitance of the capacitors may vary according to the specific requirements and the desired input and output voltages.

Similarly, it is to be understood that thermistors R203 and R205 should be selected according to the temperature dependence of the gain on the switches TR201 and TR202 or vice versa. In other words, the temperature dependence of the thermistors should provide a resistance that affects the current discharged from the capacitors C204 and C205 according to the above capacitor discharge equation, such that the current supplied to the base of the transistors counter-acts the temperature dependency of the transistors.

In an alternative preferred embodiment of the present invention according to FIG. 4, the thermistor networks TN401 and TN402 may include more than one thermistor and/or more than one resistor. As can be seen in FIG. 4, the thermistors networks may include N thermistors R401 to R401N connected in series, where N is a positive integer. Similarly, these thermistors R401 to R401N may be connected in parallel to N resistors R402 to R402N. The number of resistors does not have to equal the number of thermistors; thus, there can be more thermistors than resistors or vice versa. Furthermore, the thermistor networks TN401 and TN402 may include more than two components in parallel. For example, the thermistor networks TN401 and TN402 may include two or more resistors in parallel with each other as well as one or more thermistors also in parallel. Alternatively, the thermistor networks TN401 and TN402 may include two or more thermistors in parallel with each other as well as one or more resistors also in parallel. The thermistor networks TN401 and TN402 are connectable to the circuit of FIG. 2, according to a preferred embodiment of the present invention, via wires 403 and 404. The thermistor networks TN201 and TN202 of FIG. 2 may be substituted for alternative thermistor networks TN401 and TN402, and these alternative thermistor networks may be connected in the same way.

It is to be understood that the thermistors TN201, TN202, TN401, and TN402 may be substituted for any component capable of exhibiting a temperature dependency on component resistance. Similarly, the entire thermistor networks TN201 and TN202 may be substituted for any component capable of exhibiting a temperature dependency on component resistance.

The thermistor networks TN201 and TN202 are a type of thermal regulating component that regulate resistance and/or current depending on temperature. In this instance, FIG. 2 includes a first thermal regulating component TN201 and a second thermal regulating component TN202. The first and second thermal regulating components regulate the switching frequency of the switches TR201 and TR202 over the operating temperature range of the DC-DC converter.

Alternatively, the individual thermistors TN201, TN202, TN401, and TN402 are a type of thermal regulating component. Another example of a thermal regulating component may include a current source linked to a temperature sensor, such as a thermometer. In operation, a current of variable magnitude may be supplied to the half bridge DC-DC converter circuit, the variation in magnitude depending on the measured temperature at the temperature sensor.

It is to be understood that a thermal regulating component is therefore a component capable of regulating resistance and/or current depending on temperature.

The thermal regulating components, such as the thermistor networks, thermistors, or temperature sensors, may be positioned in close proximity to the switches/transistors, such that they are substantially in thermal equilibrium with each other, within measurement tolerances.

In an alternative preferred embodiment of the present invention, circuit 202 of FIG. 2 may be any rectifier circuit including a secondary winding SEC201. For instance, the second side rectifier circuit 102 of FIG. 1 may be incorporated according to FIG. 2. In this way, circuit 102 may replace circuit 202 to provide an output DC voltage.

It is to be understood that a magnetic core MC201 is preferable in the transformer arrangement of the present preferred embodiment of the present invention according to FIG. 2. The windings PRI201, SEC201, FB201, and FB202 may each surround a portion of the core MC201 or may be arranged such that the windings PRI201, FB201, and FB202 are disposed on a primary side of the magnetic core MC201 and the secondary winding SEC201 is disposed on a secondary side of the magnetic core MC201. In an alternative preferred embodiment, the transformer core does not need to be magnetic and may be substituted for another core material. Alternatively still, the transformer may be an air-core transformer, i.e., a solid transformer core is not present.

Preferred embodiments of the present invention may take the form of an embedded converter device, wherein the windings are disposed around a magnetic core embedded in a substrate. The converter device may advantageously be used as a portion of power switching electronic devices.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

The invention claimed is:

1. A DC-DC converter, comprising:
a first feedback winding;
a second feedback winding, wherein the first and the second feedback windings are arranged to be out of phase with respect to each other;
a drive circuit including:
  first and second switches;
  a first capacitor coupled with the first switch; and
  a second capacitor coupled with the second switch;
a first thermal regulating component coupled to the first switch and including a first thermistor and a first resistor connected in parallel; and
a second thermal regulating component coupled to the second switch and including a second thermistor and a second resistor connected in parallel; wherein
the first switch is coupled to the first feedback winding, and the second switch is coupled to the second feedback winding;
the drive circuit produces an oscillating signal by discharging the first and second capacitors alternately to energize the first and second switches;

a discharging of the first and the second capacitors is determined by electromagnetic induction in the first and second feedback windings; and
the first and the second thermal regulating components regulate the switching frequency of the first and the second switches over an operating temperature range of the DC-DC converter.

2. The DC-DC converter of claim 1, wherein
the first and the second thermal regulating components increase or decrease current provided to the first and the second switches, and
the current is increased or decreased depending on a temperature of the DC-DC converter.

3. The DC-DC converter of claim 1, wherein the first and the second switches are transistors.

4. The DC-DC converter of claim 3, wherein the transistor switches are NPN-type bipolar junction transistors.

5. The DC-DC converter of claim 1, wherein the first and the second thermistors are negative temperature coefficient (NTC) thermistors.

6. The DC-DC converter of claim 1, wherein the first and the second thermal regulating components each include a plurality of thermistors.

7. The DC-DC converter of claim 1, wherein the first thermal regulating component is connected in series with the first capacitor and the first switch, and the second thermal regulating component is connected in series with the second capacitor and the second switch.

8. The DC-DC converter of claim 1, further comprising a secondary winding that is connected to a rectifier circuit.

9. The DC-DC converter of claim 8, wherein the rectifier circuit includes at least two diodes that rectify current induced in the secondary winding.

10. The DC-DC converter of claim 1, wherein the first switch and the first thermal regulating component are substantially in thermal equilibrium with each other, and the second switch and the second thermal regulating component are substantially in thermal equilibrium with each other.

11. The DC-DC converter of claim 1, further comprising a primary winding, a secondary winding, and a magnetic core; wherein
the primary winding, the secondary winding, the first feedback winding, and the second feedback winding each surround a portion of the magnetic core.

12. The DC-DC converter of claim 11, wherein
the primary winding, the first feedback winding, and the second feedback winding surround the magnetic core on a primary side of the magnetic core; and
the secondary winding surrounds the magnetic core on a secondary side of the magnetic core.

13. The DC-DC converter device of claim 1, wherein the DC-DC converter includes a half-bridge circuit topology or a push-pull circuit topology.

14. A power switching electronic device including the DC-DC converter of claim 1.

15. A DC-DC converter comprising:
first and second input terminals;
first and second switches connected in series to each other and in parallel with the first and the second input terminals;
a first driving circuit coupled with the first switch and including:
  a first resistor;
  a first capacitor;
  a first thermal regulating component; and
  a first feedback winding;

a second driving circuit coupled with the second switch and including:
  a second resistor;
  a second capacitor;
  a second thermal regulating component;
  a second feedback winding that is out of phase with respect to the first feedback winding; wherein
during start-up and at a beginning of each switching cycle of the first and the second switches, both the first capacitor and the second capacitor are charged by a same current from the first input terminal.

16. The DC-DC converter of claim 15, wherein
the first resistor and the first thermal regulating component are connected to opposite sides of the first capacitor; and
the second resistor and the second thermal regulating component are connected to opposite sides of the second capacitor.

17. The DC-DC converter of claim 15, wherein, after start-up and the beginning of each switching cycle of the first and the second switches, the first capacitor is charged through the first thermal regulating component, and the second capacitor is charged through the second thermal regulating component.

* * * * *